(12) United States Patent
Vazquez et al.

(10) Patent No.: US 7,430,494 B2
(45) Date of Patent: Sep. 30, 2008

(54) DYNAMIC DATA STREAM HISTOGRAMS FOR NO LOSS OF INFORMATION

(75) Inventors: Pedro Vazquez, Revel (FR); Erwann Chenede, Le Versoud (FR)

(73) Assignee: Sun Microsystems, Inc., Santa Clara, CA (US)

( * ) Notice: Subject to any disclaimer, the term of this patent is extended or adjusted under 35 U.S.C. 154(b) by 178 days.

(21) Appl. No.: 11/443,935

(22) Filed: May 31, 2006

(65) Prior Publication Data

US 2007/0288205 A1 Dec. 13, 2007

(51) Int. Cl.
*G06F 17/00* (2006.01)
*G06F 17/40* (2006.01)

(52) U.S. Cl. .................. 702/180; 702/179; 702/187

(58) Field of Classification Search .............. 702/180, 702/179, 187
See application file for complete search history.

(56) References Cited

U.S. PATENT DOCUMENTS

| 4,757,464 A | * | 7/1988 | Zimmermann et al. | ...... 708/207 |
|---|---|---|---|---|
| 5,751,844 A | * | 5/1998 | Bolin et al. | ................. 382/156 |
| 6,633,684 B1 | * | 10/2003 | James | .................. 382/274 |
| 2003/0161519 A1 | * | 8/2003 | Vuylsteke | ................. 382/128 |

* cited by examiner

*Primary Examiner*—Hal D Wachsman
(74) *Attorney, Agent, or Firm*—Osha Liang LLP

(57) ABSTRACT

A method for creating a histogram that includes identifying a lower extreme range counter and an upper extreme range counter for a plurality of data elements. The method further includes incrementing a value counter when the value counter corresponds to a value of a first data element in the plurality of data elements and incrementing the lower extreme range counter when a value of a second data element in the plurality of data elements is less than a pre-defined lower boundary. The method further includes incrementing the upper extreme range counter when a value of a third data element in the plurality of data elements is greater than a pre-defined upper boundary. The method further includes creating the histogram from the value counter, the lower extreme range counter, and the upper extreme range counter.

20 Claims, 5 Drawing Sheets

DYNAMIC DATA STREAM HISTOGRAMS FOR NO LOSS OF INFORMATION

BACKGROUND

In the field of data mining, large amounts of discrete data must be analyzed. For example, in the field of weather modeling, precipitation can be represented as an amount of water molecules per unit of time (e.g., number of inches of rain per day). Researchers who study precipitation typically set multiple places of data sampling stations across the area for which the researcher is interested. Each discrete data point gathered at the data sampling station (i.e., a number representing the amount of water at a specific unit of time) is sent to a central computer at a configurable frequency. Based on all discrete data points, a researcher can forecast future precipitation. The more data points gathered the greater likelihood that the forecast is correct. Accordingly, researchers gather large amounts of data in the form of discrete data points before making the forecast.

Multiple tools exist to help individuals understand large amounts of data. One such tool is the histogram. A histogram shows a relative frequency of elements or discrete data points within a data set. Specifically, a histogram shows the distribution of elements (i.e., the number of elements that have values within a certain bucket). For example, suppose the data set represents the ages of individuals visiting a theme park. When representing the ages, buckets of the ages, such as 0-4 years old, 5-9 years old, etc. are created. The histogram for the theme part shows the number of individuals having ages within the buckets.

To construct a histogram, a complete data set is required. In particular, all elements are obtained before construction. Because the data set is complete, the histogram can give a more accurate representation of the data. For example, a histogram in which 99% of the elements are within a single bucket is typically not helpful. However, with the complete data set, the buckets may be distributed across the range of the data set to provide a more useful representation of data.

Often, a large volume of data is submitted as a data stream. Specifically, often a complete data set is not known prior to construction because data is constantly being sampled. In such scenarios, the complete data stream is stored. Upon receiving a request for a histogram, the histogram is statically calculated from the stored data stream using the snapshot of data in storage.

Further, data sets often contain noise and/or outliers. Noise corresponds to faulty values in the data sets that, for example, are the product of faulty measuring. Outliers correspond to the values that are on the extreme (i.e., fall outside the generally collected data). For example, suppose that the data set represents the temperature in Houston during the summer months and a data element is received for the temperature with value of 45 degrees Fahrenheit (° F.) because of a highly unusual cold front. In such scenario, an outlier is 45° F. because the general temperature during the summer months is 75° F. to 106° F.

SUMMARY

In general, in one aspect, the invention relates to a method for creating a histogram from a plurality of data elements that includes identifying a lower extreme range counter and an upper extreme range counter for the plurality of data elements, incrementing a value counter when the value counter corresponds to a value of a first data element in the plurality of data elements, incrementing the lower extreme range counter, wherein incrementing the lower extreme range counter is performed when a value of a second data element in the plurality of data elements is less than a pre-defined lower boundary, incrementing the upper extreme range counter, wherein incrementing the upper extreme range counter is performed when a value of a third data element in the plurality of data elements is greater than a pre-defined upper boundary, and creating the histogram from the value counter, the lower extreme range counter, and the upper extreme range counter.

In general, in one aspect, the invention relates to a system for creating a histogram from a plurality of data elements that includes a data repository for storing a value counter, a lower extreme range counter, and an upper extreme range counter, and a histogram engine configured to identify the lower extreme range counter and the upper extreme range counter for the plurality of data elements, increment the value counter when the value counter corresponds to a value of a first data element in the plurality of data elements, increment the lower extreme range counter, wherein incrementing the lower extreme range counter is performed when a value of a second data element in the plurality of data elements is less than a pre-defined lower boundary, increment the upper extreme range counter, wherein incrementing the upper extreme range counter is performed when a value of a third data element in the plurality of data elements is greater than a pre-defined upper boundary, and create the histogram from the value counter, the lower extreme range counter, and the upper extreme range counter.

In general, in one aspect, the invention relates to a computer usable medium that includes computer readable program code embodied therein for causing a computer system to identify a lower extreme range counter and an upper extreme range counter for a plurality of data elements, increment a value counter when the value counter corresponds to a value of a first data element in the plurality of data elements, increment the lower extreme range counter, wherein incrementing the lower extreme range counter is performed when a value of a second data element in the plurality of data elements is less than a pre-defined lower boundary, increment the upper extreme range counter, wherein incrementing the upper extreme range counter is performed when a value of a third data element in the plurality of data elements is greater than a pre-defined upper boundary, and create a histogram from the value counter, the lower extreme range counter, and the upper extreme range counter.

Other aspects of the invention will be apparent from the following description and the appended claims.

DETAILED DESCRIPTION

Figure 1:
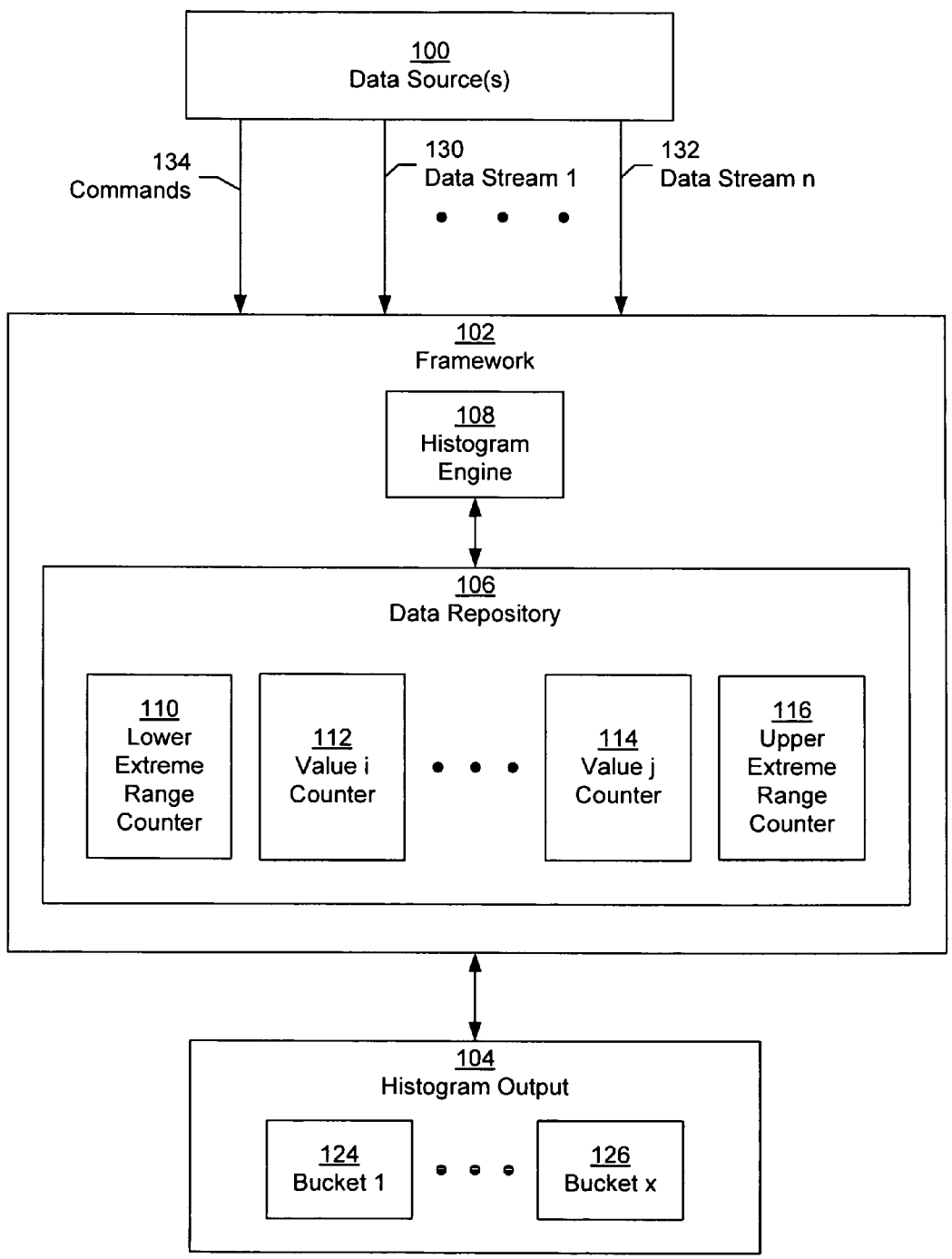
FIG. 1 shows a schematic diagram of a system for creating a histogram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for creating a histogram from a data stream in accordance with one or more embodiments of the invention. Specifically, embodiments of the invention provide a method and system for receiving data from a data stream, adding the data to an appropriate counter, and outputting a histogram based on values in the counters.

Moreover, embodiments of the invention provide a mechanism whereby the counters maintain values of data elements that are within a focus with greater precision than values that exists outside of the focus. Specifically, in one or more embodiments of the invention, a data set has a lower extreme range of values, a focus, and an upper extreme range of values. The focus corresponds to a range that represents the majority of values of data elements in the data set.

Accordingly, in one or more embodiments of the invention, values of data elements that are outside of a focus (i.e., the extreme ranges) are stored in at least one separate counter that represent values of data elements with minimal precision. In contrast values within the focus have maximal precision. Specifically, values within the focus maintain the same precision as when the value is received from the data stream in accordance with one or more embodiments of the invention. In addition, embodiments of the invention are able to dynamically detect the focus of the data stream.

In the following example, consider the case in which a researcher studies the temperature in a particular city during the summer months. On average, the temperature may range between 80 degrees Fahrenheit (° F.) and 100° F. around noon. In particular, the temperature is typically between 85° F. and 95° F. However, about one-fiftieth of the time, the temperature is measured as below 65° F. or above 110° F. When studying the temperature for the particular city, the researcher is more interested at the focus (i.e. between 80° F. and 100° F.) and less interested in the extreme ranges.

Accordingly, in the example, while the researcher may require information about how many temperatures are in the extreme range(s), the researcher requires the most information about the distribution of values of data elements within the focus. Thus, in one or more embodiments of the invention, values of data elements that are within the focus are maintained in value counters representing the actual value of the data element, while value counters outside of the focus are maintained in an extreme range counter in accordance with one or more embodiments of the invention.

FIG. 1 shows a schematic diagram of a system for creating a histogram in accordance with one or more embodiments of the invention. As shown in FIG. 1, the system includes data source(s) (100), a framework (102), and histogram output (104). Each of these components is described below.

A data source (100) corresponds to any type of mechanism that includes functionality to transmit data. For example, a data source may correspond to a sampling device that includes functionality to capture and transmit data, a computer, a person that inputs data, or any other source. Further, multiple data sources of a variety of types may exist. In one or more embodiments of the invention, a data source (100) trans-mits data over duration of time. Specifically, in accordance with one or more embodiments of the invention, the capturing of data is continual. Thus, the data source includes functionality to transmit data in the form of data streams (e.g., data stream 1 (130), data stream n (132)).

A data stream (e.g., data stream 1 (130), data stream n (132)) corresponds to a series of data. Those skilled in the art will appreciate that the data stream may not be continuous. Specifically, a data stream may be interrupted and/or transmitted only for duration of time in which data is captured. Further, in one or more embodiments of the invention, the data stream (e.g., data stream 1 (130), data stream n (132)) may correspond to a series of numerical values captured with a variety of precisions. For example, some data elements sent on the data stream may have values with digits tenth (e.g., 87.3, 9232.8, etc), while other data elements may have only whole number values (e.g., −1, 8, 3, etc.).

In addition to a data stream (e.g., data stream 1 (130), data stream n (132)), a data source (100) also includes functionality to transmit commands (134) in accordance with one or more embodiments of the invention. A command (134) corresponds to any type of request. For example, a command may correspond to a command for initializing data collection or for specifying parameters to create the histogram. Those skilled in the art will appreciate that a separate data source (100) may transmit the commands (134) while a different data source (100) that includes functionality to transmit data. Further, the data source (100) may be of heterogeneous types. For example, the data source to transmit commands may correspond to a person, while the data source for transmitting data may correspond to a sampling station.

Continuing with FIG. 1, the data source (100) is connected to a framework (102). Specifically, in one or more embodiments of the invention, the data source (100) includes functionality to transmit data directly or indirectly to the framework (102). The framework (102) corresponds to a component that includes functionality to receive data and commands from the data stream, store data, and create a histogram. In one or more embodiments of the invention, the framework (102) includes a data repository (106) and a histogram engine (108). The data repository (106) and the histogram engine (108) are described below.

A data repository (106) corresponds to a storage unit, such as physical memory locations, database, vector, etc. for storing data from the data stream (e.g., data stream 1 (130), data stream n (132)). In one or more embodiments of the invention, a data repository (106) includes a lower extreme range counter (110), at least one value counter (e.g., value i counter (112), value j counter (114)), and an upper extreme range counter (116). Each of these components is described below.

A value counter (e.g., value i counter (112), value j counter (114)) correspond to a counter that includes functionality to identify a number (i.e., the value of the value counter) of data elements that have values within a range of values. The range of data elements represented by the value counter (e.g. value i counter (112), value j counter (114)) may have a minimum value and a maximum value. The minimum value corresponds to the lowest value represented by the value counter. The maximum value represents the greatest value represented by the value counter. In one or more embodiments of the invention, a value counter represents a single value. In such scenarios, the minimum value and the maximum value represented by the value counter correspond to the same value. Thus, the precision by which the value counter represents the values is the same as the values from the data stream (e.g., data stream 1 (130), data stream n (132)).

A lower extreme range counter (110) corresponds to a counter that includes functionality to identify the number of data elements that have values that are less than the focus. Specifically, values that are in the lower extreme range are represented by a single counter in accordance with one or more embodiments of the invention. Those skilled in the art will appreciate that rather than grouping all lower extreme range values within the same counter, the lower extreme range counter (110) may correspond to multiple counters that maintain the number of data elements with less precision than the value counters.

Conversely, the upper extreme range counter (116) corresponds to a counter that includes functionality to identify the number of data elements that have values that are greater than the focus (i.e. the values of data elements that are in the upper extreme range).

Those skilled in the art will appreciate that the lower extreme range value counter (112) and upper extreme range value counter (114) may correspond to the same counter. Specifically, the same counter may be used to represent the values within the lower extreme range and the upper extreme range in accordance with one or more embodiments of the invention.

Continuing with FIG. 1, the framework (102) also includes a histogram engine (108). A histogram engine (108) corresponds to a logical component that includes functionality to receive and interpret commands (134), store the data from the data stream (e.g., data stream 1 (130), data stream n (132)) into the correct counter (e.g., lower extreme range counter (110), value counter 1 (112), value counter j (114), upper extreme range counter (116)), and create the histogram output (104).

The histogram output (104) corresponds to the any type of histogram representation of the data in the counters (e.g., lower extreme range counter (110), value counter 1 (112), value counter j (114), upper extreme range counter (116)). For example, the histogram output (104) may be graphical, numerical, etc. Within the histogram output (104) are multiple buckets (e.g., bucket 1 (124), bucket x (126)). In one or more embodiments of the invention, each bucket (e.g., bucket 1 (124), bucket x (126)) is a counter corresponding the sum of one or more value counters (e.g., lower extreme range counter (110), value counter 1 (112), value counter j (114), upper extreme range counter (116)).

Figure 2:
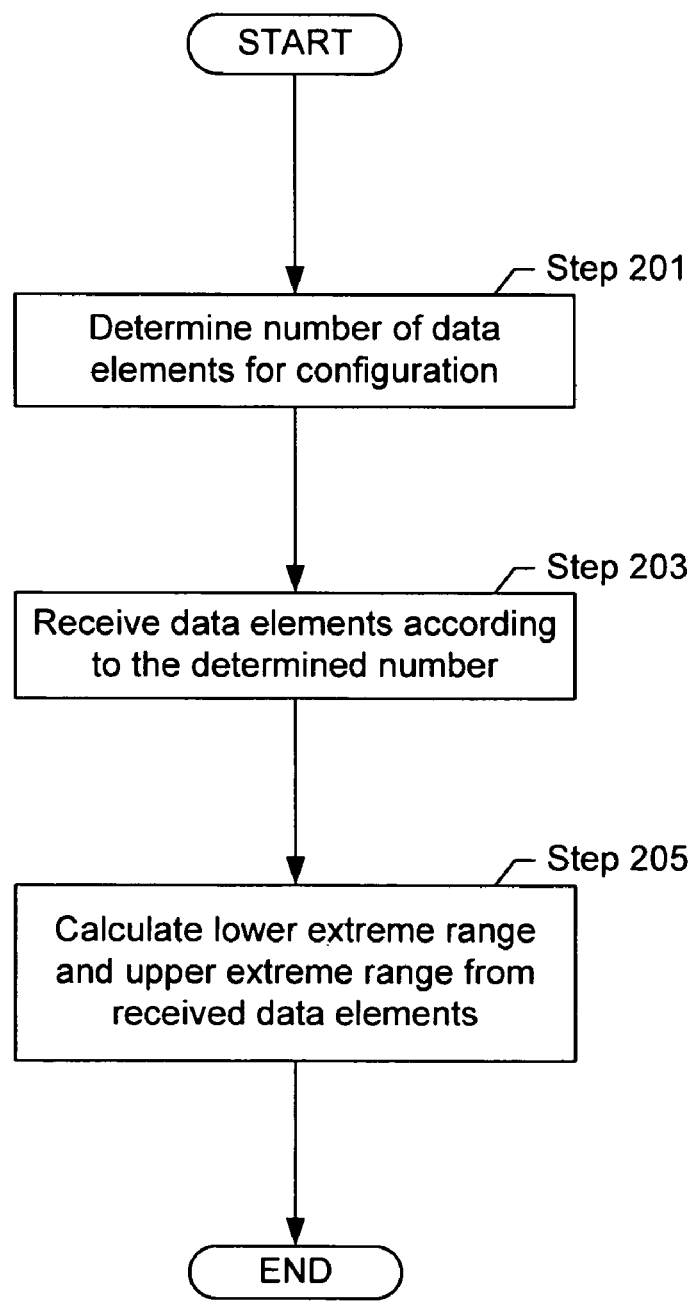
FIG. 2 shows a flowchart of a method for configuring the framework to create the histogram from a data stream in accordance with one or more embodiments of the invention.

Before the histogram output is created, the framework is configured in accordance with one or more embodiments of the invention. FIG. 2 shows a flowchart of a method for configuring the framework to create the histogram from a data stream in accordance with one or more embodiments of the invention. Specifically, FIG. 2 shows a flowchart of a method for identifying the lower extreme range and the upper extreme range.

Initially, the number of data elements is determined for the configuration (Step 201). Specifically, a determination is made as to how many data elements should be received to identify the focus. In one or more embodiments of the invention, the larger the number received for configuration, the more accurate the identification of the focus. Those skilled in the art will appreciate that the number may follow the law of diminishing returns in which after a certain number of data elements are received, the benefit for identifying the focus diminishes.

Next, the data elements are received according to the determined number (Step 203). In particular, the determined number of data elements is received from the data stream to obtain received data elements in which each data element has a value. At this stage, the values of the data elements are stored in such a manner as to maintain the same precision that was used when sent on the data stream.

From the received data elements, the lower extreme range and the upper extreme range are calculated (Step 205). The lower extreme range and the upper extreme range may be calculated using a statistical analysis on the values of the received data elements.

In one or more embodiments of the invention, the lower extreme range and the upper extreme range correspond to a configurable percentage of the data elements. Using the percentage, the extreme ranges may be calculated. For example, if a goal is to have ninety-five percent of the data elements within the focus, and the data elements follow a normal distribution, then the mean and the variance of the values of the received data elements can be calculated. Based on the mean and variance, the focus may be determined and the lower extreme range and the upper extreme range calculated.

Those skilled in the art will appreciate that multiple techniques exist that can be used to calculate or identify the lower extreme range and the upper extreme range from the received data elements. For example, a variety of statistical or numerical analysis may be performed on the received data elements. Alternatively, a user or knowledge base may be used to determine and identify the lower extreme range, the focus, and the upper extreme range.

Once the lower extreme range, the focus, and the upper extreme range are calculated, then the counters may be instantiated and configured. Configuring the counters may be performed by identifying the range represented by each counter (e.g., lower extreme range counter, value counters, and upper extreme range counter). After instantiating and configuring the counters, then data and commands may be received and processed from the data source.

Figure 3A:
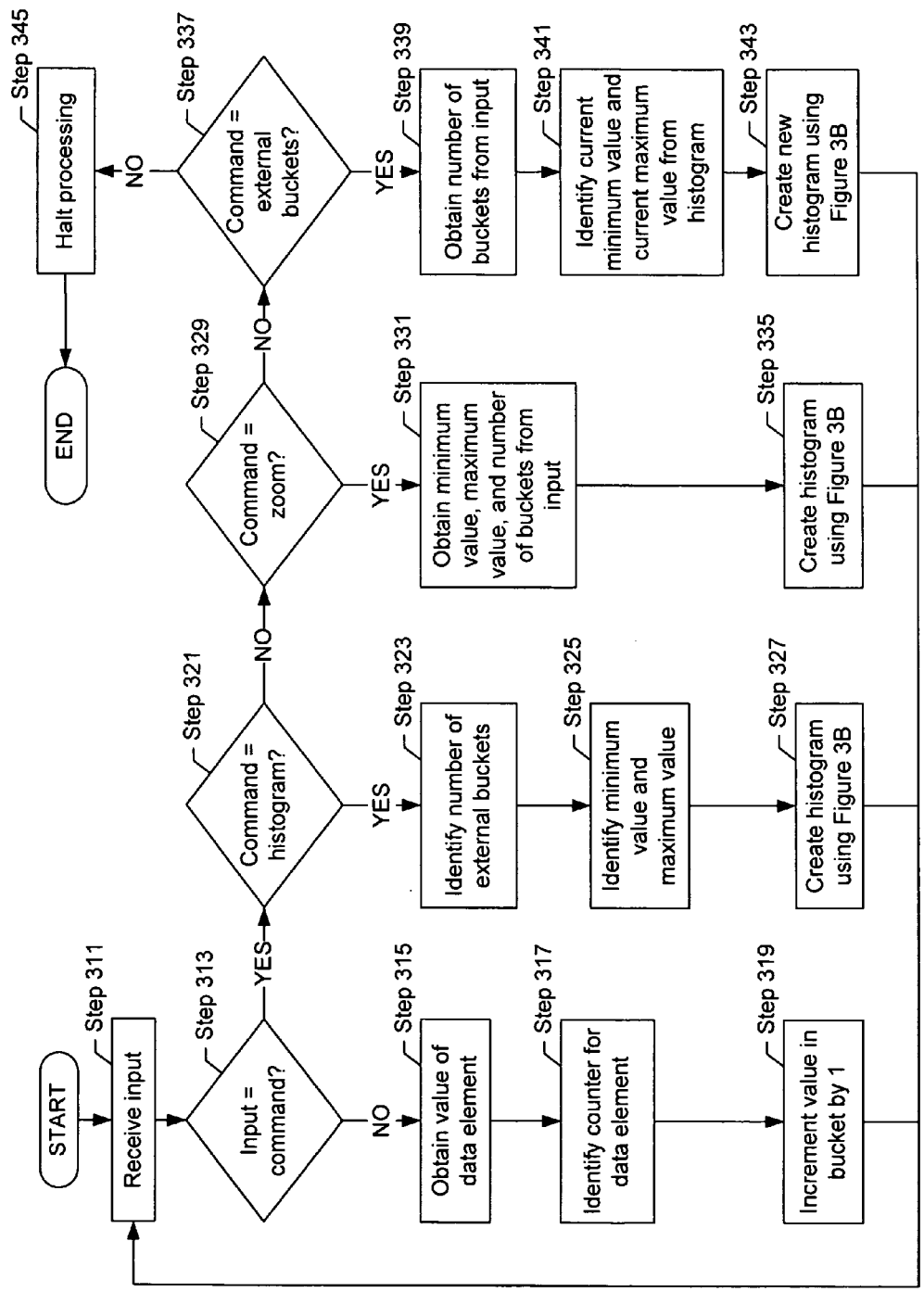
FIGS. 3A-3B shows a flowchart of a method for creating a histogram from a data stream in accordance with one or more embodiments of the invention.
Figure 3B:
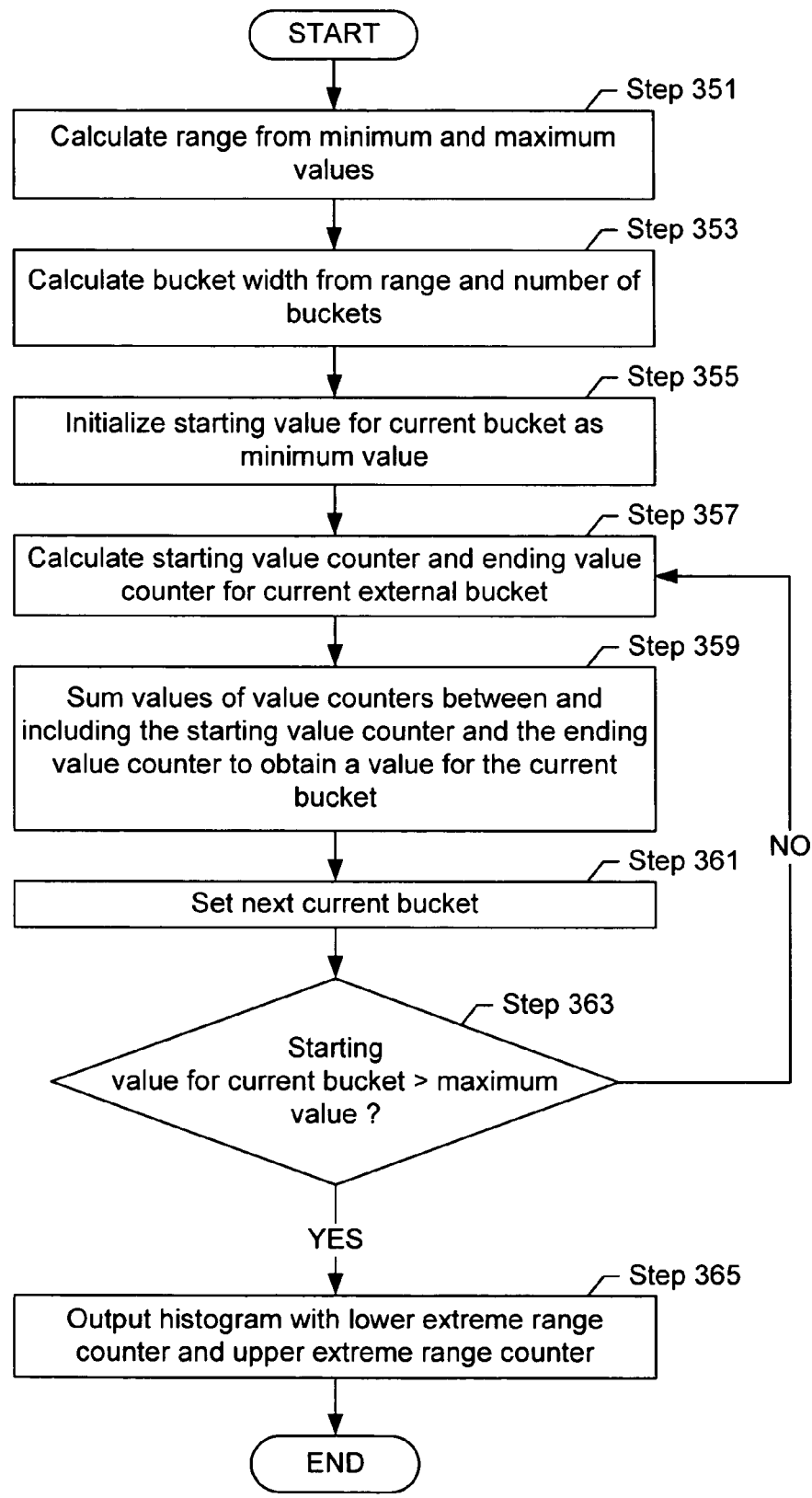

FIGS. 3A-3B shows a flowchart of a method for creating a histogram from a data stream in accordance with one or more embodiments of the invention. Specifically, FIG. 3A shows a flowchart of a method for processing input.

Initially, input is received (Step 311). The receiving of input may be performed using techniques well known in the art. For example, input may be sent as a message from the data source and processed according to the type of message. Further, in one or more embodiments of the invention, input is continually being received in the form of separate data elements or commands. Accordingly, each data element and/or individual command may be processed individually in accordance with one or more embodiments of the invention.

Once the input is received, then a determination is made whether the input is a command (Step 313). If the input is not a command, then the input is most likely a data element in accordance with one or more embodiments of the invention. Thus, the value of the data element is obtained (Step 315). At this stage, the value of the data element may be obtained directly from the input. For example, the data stream upon which the input arrives may include input in the form of values of data elements in a sequence (e.g. 4.86, 3.40984, 7832.29, etc.). Each data element corresponds to individual input. Those skilled in the art will appreciate that multiple optimization mechanisms exist to enhance performance. For example, multiple data elements may be received from the data stream and processed in parallel.

Continuing with FIG. 3A, the counter is identified for the data element (Step 317). In particular, the counter may be identified using the value of the data element. Identifying the counter may include identifying range of values in which the value of the data element is within. For example, consider the case in which the value of the data element is 5.509. A value counter may exist that represents the range between 5.489 and 6.893. Accordingly, the value counter is identified as the value counter for the data element. Alternatively, the value counter may represent the single value of 5.509. As another alternative, if the value of the data element is in the extreme range, then the identified counter corresponds to one of the extreme range counters.

After identifying the counter, the value in the counter is incremented by one (Step 319). Thus, the counter represents the number of data elements that are received from the data stream and fall within the range represented by the counter. Further, because the counters track the number of data elements having the same value or within the same range of values, each data element is only processed once in accordance with one or more embodiments of the invention. After the data element is processed, then the method may continue with receiving more input from the data stream (Step 311).

Continuing with FIG. 3A, if alternatively, the input is a command, then a determination is made whether the command is to create a histogram (Step 321). Specifically, in accordance with one or more embodiments of the invention, the command may be to create a histogram using default values. Accordingly, the number of buckets is identified (Step 323). The number of buckets may be identified the default values. Also at this stage, the minimum and maximum value for the histogram output is identified. The minimum and maximum value may be set as default values, set according to the range of the values of the data elements from the data stream (e.g., the minimum and maximum value of the data elements from the data stream, that 90% of the values are represented by the histogram output, etc.). Once the number of buckets, the minimum value, and the maximum value is identified, then the histogram can be created using FIG. 3B (Step 327) and described below.

Alternatively, if the command is not to create a histogram, then the command may be to zoom into an existing histogram output. Accordingly, a determination is made whether the command is to zoom (Step 329). If the command is to zoom, then the minimum value, the maximum value, and the number of buckets is obtained from the input in accordance with one or more embodiments of the invention (Step 331). Specifically, the aforementioned values may be obtained as input parameters with the command to zoom. More specifically, by specifying the aforementioned values, the data source specifies how much to zoom and which portion of the histogram is of interest.

Alternatively, if the command is not to zoom into an existing histogram, than the command may be to provide greater granularity with an existing histogram. Accordingly, a determination is made whether the command is for specifying buckets (Step 337). If the command is for specifying the number of buckets, then the number of buckets is obtained from the input. Typically, the number of buckets may be specified as input parameters in the command.

Also, at virtually any time before creating the new histogram output, the current minimum value and maximum value are identified from the existing histogram (Step 341). In one or more embodiments of the invention, the current minimum value and maximum value may be retained with each creation of a histogram. Accordingly, by accessing the retained values, the current minimum value and the current maximum value can be identified.

Once the current minimum value, maximum value and the number of buckets are obtained, then the histogram may be created using FIG. 3B in accordance with one or more embodiments of the invention.

If as an alternative, the command is not for increasing the granularity of an existing histogram, then the command is most likely to halt processing (Step 345) in accordance with one or more embodiments of the invention. For example, the command may specify that the current values in the value counters should be erased, or that the framework will not receive more commands and therefore may relinquish memory.

As discussed above, once at least some of the data elements are processed, and after obtaining or identifying the minimum value, maximum value, and number of buckets to create the histogram, the histogram may be created in accordance with one or more embodiments of the invention. FIG. 3B shows a flowchart of a method for creating a histogram in accordance with one or more embodiments of the invention.

Initially, the range is calculated from the minimum value and the maximum value (Step 351). The range may be calculated by subtracting the maximum value from the minimum value in accordance with one or more embodiments of the invention.

After calculating the range, the bucket width is calculated from the range and the number of buckets (Step 353). Specifically, the bucket width may be calculated, for example, by dividing the range by the number of buckets. Alternatively, if the bucket width is variable between buckets, then the bucket width for each bucket may be calculated or specified by the input parameters.

Next, the starting value for the current bucket is initialized as the minimum value (Step 355). Specifically, at this stage the current bucket corresponds to the bucket that represents the lowest range of values in the focus.

Also at this stage, the starting value counter and the ending value counter is calculated for the current bucket (Step 357). Calculating the starting value counter and the ending value counter may be performed by using the starting value for the current bucket. Next, the value counter that represents the starting value is set as the starting value counter.

Similarly, the ending value counter may be performed by adding the bucket width to the starting value for the bucket. The resulting sum is the ending value for the current bucket. Accordingly, the value counter that represents the ending value is identified.

In one or more embodiments of the invention, for at least some of the buckets, the starting value and/or the ending value do not correspond to the minimum value or maximum value for any of the value counters. Specifically, the granularity of the value counters may preclude obtaining an exact number of data elements that have values between the starting value and the ending value for the buckets. Accordingly, in such cases, a variety of heuristics may be used to estimate the number of data elements that have values between the starting value and ending value for the bucket.

Continuing with FIG. 3B, after calculating the starting value counter and the ending value counter for the current bucket, the values of the value counters between and including the starting value counter and ending value counter are summed to obtain the value for the current bucket (Step 359). Specifically, the values in each value counter that represents values of data elements between the starting value and ending value for the current bucket are totaled in accordance with one or more embodiments of the invention. The resulting value is set in the current bucket as the total number of data elements that have been received from the data stream having values between the starting value and the ending value for the current bucket.

Once the value for the current bucket is obtained, the next current bucket is set (Step 361). Specifically, at this stage, the ending value for the previous bucket is set as the starting value for the next bucket. Those skilled in the art will appreciate that setting the ending value as the starting value may be performed so as to avoid overlap in accordance with one or more embodiments of the invention.

After setting the starting value for the current bucket, a determination is made whether the starting value is greater than the maximum value for the histogram (Step 363). If the starting value is greater than the maximum value than more buckets exist. Thus, in one or more embodiments of the invention, the method repeats with calculating the starting value counter and the ending value counter (Step 357) (described above).

Alternatively, if the starting value for the current bucket is greater than the maximum value, then most likely all buckets for the histogram have values. Thus, the histogram is outputted with the lower extreme range counter and the upper extreme range counter (Step 365). Outputting the histogram may be performed in virtually any manner using techniques known in the art. For example, the starting value, ending value, and value of the bucket for each bucket may be outputted to a file, graphical output, etc.

Those skilled in the art will appreciate that while FIG. 3B shows creating the histogram starting with the bucket that represents the lowest range of values of data elements, the value in each bucket may be calculated in virtually any order. Specifically, the value for any bucket may be calculated by identifying the starting value counter and the ending value counter for the bucket, and totaling the values between the starting value counter and the ending value counter.

Those skilled in the art will appreciate that while FIG. 3B shows one method for creating a histogram from the value counters, other methods may also exist.

Figure 4:
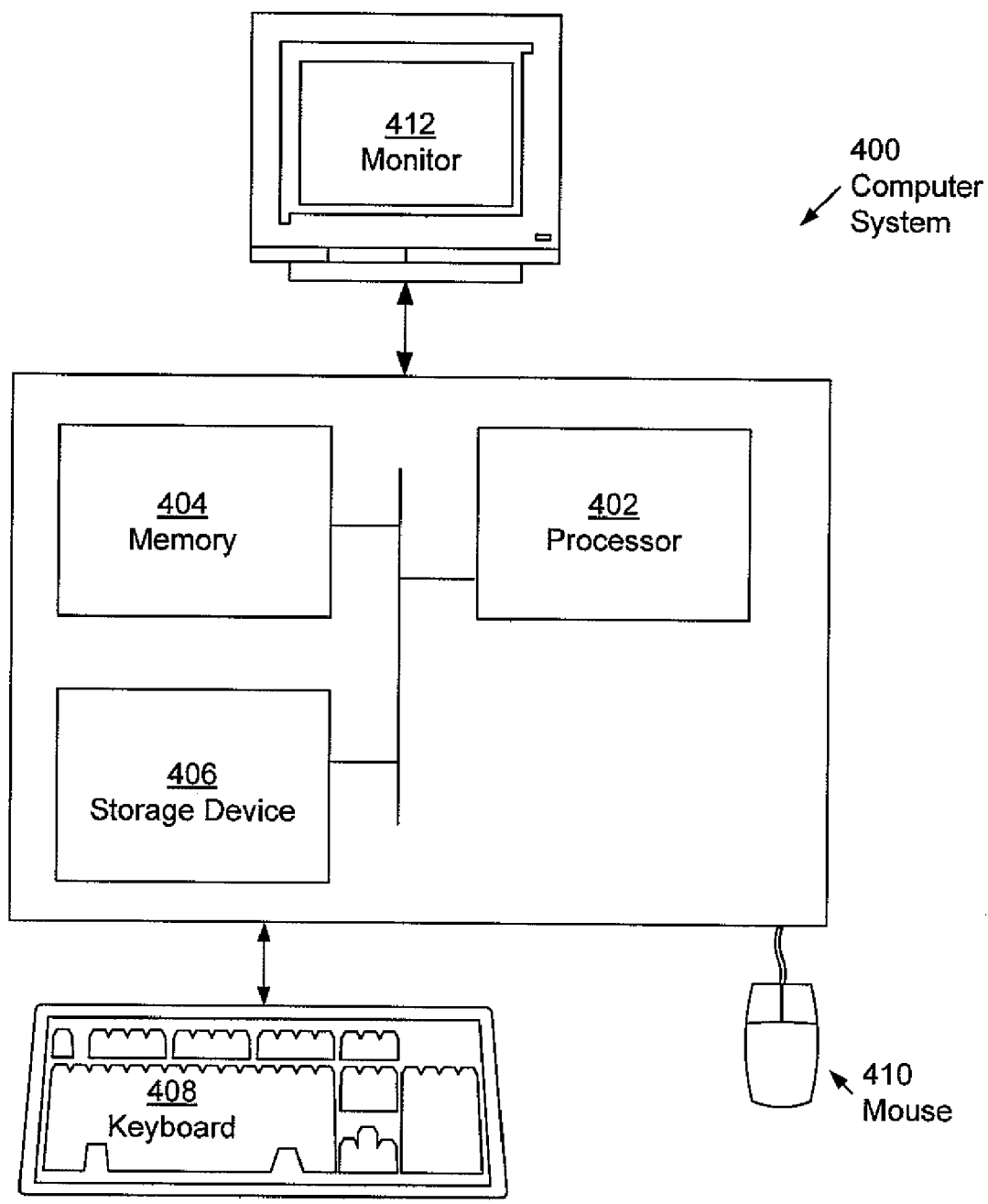
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., histogram engine, data sources, histogram output, value counters, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for constructing a histogram from a data stream by reviewing the values of the data elements only once. Thus, the processing time for reviewing each data element, in which repetition in the data elements exist, is minimized.

Further, the memory requirements for storing the values of the data elements are known prior to receiving the data elements in accordance with one or more embodiments of the invention. Specifically, by maintaining the information in counters, the amount of memory required corresponds to the number of different values of data elements rather than the number of data elements. Thus, the memory requirements for storing the values of the data elements are not exceeded.

Moreover, precision may be maintained in the focus in order to give an accurate representation of the distribution of the data elements without the storage requirements for maintaining precision in the extreme range values. Specifically, the number of extreme range values is maintained without keeping the distribution of the extreme range values in accordance with one or more embodiments of the invention.

Wile the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a histogram from a plurality of data elements comprising:
    identifying a lower extreme range counter and an upper extreme range counter for the plurality of data elements, wherein the lower extreme range counter and the upper extreme range counter are each one of a plurality of counters;
    incrementing a value counter when the value counter corresponds to a value of a first data element in the plurality of data elements, wherein the value counter is one of a plurality of value counters, and wherein the plurality of value counters is a subset of the plurality of counters;
    incrementing the lower extreme range counter, wherein incrementing the lower extreme range counter is performed when a value of a second data element in the plurality of data elements is less than a pre-defined lower boundary;
    incrementing the upper extreme range counter, wherein incrementing the upper extreme range counter is performed when a value of a third data element in the plurality of data elements is greater than a pre-defined upper boundary;
    creating the histogram from the value counter, the lower extreme range counter, and the upper extreme range counter; and
    displaying the histogram.

2. The method of claim 1, wherein identifying the lower extreme range counter and the upper extreme range counter for the plurality of data elements comprises:
    receiving a plurality of initialization values; and
    assigning the pre-defined lower boundary and the pre-defined upper boundary from the plurality of initialization values.

3. The method of claim 2, wherein assigning the pre-defined lower boundary and the pre-defined upper boundary for the plurality of initialization values comprises:
    calculating the pre-defined lower boundary using a percentage,
        wherein the percentage of the plurality of initialization values are less than the lower boundary; and
    calculating the pre-defined upper boundary using the percentage,
        wherein the percentage of the plurality of initialization values are greater than the upper boundary.

4. The method of claim 1, further comprising:
    receiving the plurality of data elements continually from a network, wherein the plurality of counters are incremented while the plurality of data elements are received.

5. The method of claim 1, wherein creating the histogram comprises:
    identifying a minimum value and a maximum value for the plurality of counters;
    calculating a range according to the minimum value and the maximum value;
    calculating a starting value counter of the plurality of value counters and an ending value counter of the plurality of value counters for each of a plurality of buckets in the range; and
    summing a subset of the plurality of value counters for each of the plurality of buckets to create a total for each of the plurality of buckets, wherein the subset of the plurality of value counters are between the starting value counter and ending value counter, and
    wherein displaying the histogram comprises:
        displaying the total for each of the plurality of buckets.

6. The method of claim 5, wherein the maximum value and the minimum value are determined by parameters passed when creating the histogram.

7. The method of claim 5, wherein creating the histogram further comprises:
    identifying a pre-defined number of the plurality of buckets, wherein the starting value counter and ending value counter is calculated using a pre-defined number of the plurality of buckets and the range.

8. The method of claim 7, wherein the pre-defined number of the plurality of buckets is determined by a parameter passed when creating the histogram.

9. The method of claim 5, wherein displaying the histogram further comprises:
    displaying the lower extreme range counter and the upper extreme range counter.

10. A system for creating a histogram from a plurality of data elements comprising:
    a data repository for storing a value counter, a lower extreme range counter, and an upper extreme range counter, wherein the lower extreme range counter and the upper extreme range counter are each one of a plurality of counters, wherein the value counter is one of a plurality of value counters, and wherein the plurality of value counters is a subset of the plurality of counters; and
    a histogram engine configured to:
        identify the lower extreme range counter and the upper extreme range counter for the plurality of data elements;
        increment the value counter when the value counter corresponds to a value of a first data element in the plurality of data elements;
        increment the lower extreme range counter, wherein incrementing the lower extreme range counter is performed when a value of a second data element in the plurality of data elements is less than a pre-defined lower boundary;
        increment the upper extreme range counter, wherein incrementing the upper extreme range counter is performed when a value of a third data element in the plurality of data elements is greater than a pre-defined upper boundary; and
        create the histogram from the value counter, the lower extreme range counter, and the upper extreme range counter,
    wherein the histogram is displayed.

11. The system of claim 10, wherein identifying the lower extreme range counter and the upper extreme range counter for the plurality of data elements comprises:
    receiving a plurality of initialization values; and
    assigning the pre-defined lower boundary and the pre-defined upper boundary from the plurality of initialization values.

12. The system of claim 11, wherein assigning the pre-defined lower boundary and the pre-defined upper boundary for the plurality of initialization values comprises:
    calculating the pre-defined lower boundary using a percentage,
        wherein the percentage of the plurality of initialization values are less than the lower boundary; and
    calculating the pre-defined upper boundary using the percentage,
        wherein the percentage of the plurality of initialization values are greater than the upper boundary.

13. The system of claim 10, wherein the histogram engine is further configured to:
    receiving the plurality of data elements continually from a network,
    wherein the plurality of counters are incremented while the plurality of data elements are received.

14. The system of claim 10, wherein creating the histogram comprises:
    identifying a minimum value and a maximum value for the plurality of counters;
    calculating a range according to the minimum value and the maximum value;
    calculating a starting value counter of the plurality of value counters and an ending value counter of the plurality of value counters for each of a plurality of buckets from the range;
    summing a subset of the plurality of value counters for each of the plurality of buckets to create a total for each of the plurality of buckets, wherein the subset of the plurality of value counters are between the starting value counter and ending value counter; and
    outputting the total for each of the plurality of buckets.

15. The system of claim 14, wherein the maximum value and the minimum value are determined by parameters passed when creating the histogram.

16. The system of claim 14, wherein creating the histogram further comprises:
    identifying a pre-defined number of the plurality of buckets, wherein the starting value counter and ending value counter is calculated using the pre-defined number of the plurality of buckets and the range.

17. The system of claim 16, wherein the pre-defined number of the plurality of buckets is determined by a parameter passed when creating the histogram.

18. The system of claim 14, wherein creating the histogram further comprises:
    outputting the lower extreme range counter and the upper extreme range counter.

19. A computer readable medium comprising computer readable program code embodied therein for creating a histogram from a plurality of data elements by causing a computer system to:
    identify a lower extreme range counter and an upper extreme range counter for a plurality of data elements;
    increment a value counter when the value counter corresponds to a value of a first data element in the plurality of data elements;
    increment the lower extreme range counter, wherein incrementing the lower extreme range counter is performed when a value of a second data element in the plurality of data elements is less than a pre-defined lower boundary;

increment the upper extreme range counter, wherein incrementing the upper extreme range counter is performed when a value of a third data element in the plurality of data elements is greater than a pre-defined upper boundary;

create a histogram from the value counter, the lower extreme range counter, and the upper extreme range counter and displaying the histogram.

20. The computer readable medium of claim 19, wherein identifying the lower extreme range counter and the upper extreme range counter for the plurality of data elements comprises:

receiving a plurality of initialization values; and assigning the pre-defined lower boundary and the pre-defined upper boundary from the plurality of initialization values.

* * * * *